United States Patent
Goto et al.

(10) Patent No.: US 11,469,780 B2
(45) Date of Patent: Oct. 11, 2022

(54) SIGNAL GENERATION APPARATUS AND SIGNAL GENERATION METHOD

(71) Applicant: ANRITSU CORPORATION, Kanagawa (JP)

(72) Inventors: Kenji Goto, Kanagawa (JP); Ryo Inomata, Kanagawa (JP); Hirofumi Ono, Kanagawa (JP); Mayfor Dangkiw, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 21 days.

(21) Appl. No.: 17/231,410

(22) Filed: Apr. 15, 2021

(65) Prior Publication Data

US 2021/0328604 A1 Oct. 21, 2021

(30) Foreign Application Priority Data

Apr. 17, 2020 (JP) .............................. JP2020-073876

(51) Int. Cl.
| | | |
|---|---|---|
| H04L 25/49 | (2006.01) | |
| H04B 1/00 | (2006.01) | |
| H04B 17/13 | (2015.01) | |
| H04B 10/2575 | (2013.01) | |

(52) U.S. Cl.
CPC ....... H04B 1/0014 (2013.01); H04B 10/2575 (2013.01); H04B 17/13 (2015.01)

(58) Field of Classification Search
CPC ... H04B 1/0014; H04B 10/2575; H04B 17/13
USPC ........................................ 375/262, 296, 297
See application file for complete search history.

(56) References Cited

U.S. PATENT DOCUMENTS

| | | | | | |
|---|---|---|---|---|---|
| 5,321,849 | A | * | 6/1994 | Lemson | H03G 3/3084 455/249.1 |
| 5,877,653 | A | * | 3/1999 | Kim | H03F 1/3252 330/149 |
| 2003/0076894 | A1 | * | 4/2003 | Jin | H03F 1/3241 375/296 |
| 2008/0260066 | A1 | * | 10/2008 | Cai | H03F 1/3241 375/296 |
| 2015/0214987 | A1 | * | 7/2015 | Yu | H04B 1/0475 375/297 |

FOREIGN PATENT DOCUMENTS

JP 2019-129333 A 8/2019

* cited by examiner

*Primary Examiner* — Don N Vo
(74) *Attorney, Agent, or Firm* — Pearne & Gordon LLP

(57) ABSTRACT

According to the present disclosure, there is provided a signal generation apparatus including: a base band module (11); a DA converter that converts digital base band signals into modulation signals corresponding to a plurality of cells; an RF converter (20) to which the modulation signals corresponding to the plurality of cells are input, and which outputs an RF signal obtained by frequency-converting the modulation signal; and an RF converter control unit (31), in which the RF converter control unit controls the base band module to reduce a power value of a digital base band signal corresponding to a predetermined cell, among the digital base band signals corresponding to the plurality of cells in the base band module so that an input level of the modulation signal input to the RF converter is equal to or lower than an input limit value of the RF converter.

12 Claims, 5 Drawing Sheets

Parameter setting table

|  | SCS (kHz) | CBW (MHz) | MAX RB | EPRE (dBm) | Cell setting flag | Physical channel setting flag |
|---|---|---|---|---|---|---|
| Cell#1 | 15 | 50 | 270 | -99.9 | Invalid | Invalid |
| Cell#2 | 15 | 50 | 270 | -99.9 | Invalid | Invalid |
| Cell#3 | 15 | 50 | 270 | -99.9 | Invalid | Invalid |
| Cell#4 | 15 | 50 | 270 | -99.9 | Invalid | Invalid |
| Cell#5 | 15 | 50 | 270 | -99.9 | Invalid | Invalid |
| Cell#6 | 15 | 50 | 270 | -99.9 | Invalid | Invalid |
| Cell#7 | 15 | 50 | 270 | -99.9 | Invalid | Invalid |
| Cell#8 | 15 | 50 | 270 | -99.9 | Invalid | Invalid |

SIGNAL GENERATION APPARATUS AND SIGNAL GENERATION METHOD

TECHNICAL FIELD

The present disclosure relates to a signal generation apparatus and a signal generation method for generating a test signal.

BACKGROUND ART

A signal generation apparatus for generating a test signal for testing a mobile communication device is proposed (see, for example, Patent Document 1). The signal generation apparatus of Patent Document 1 modulates an analog signal for testing, amplifies the modulated analog signal, adjusts a level of the amplified analog signal, and outputs an analog RF signal for testing from an antenna.

In a module which amplifies and adjusts the level of the analog signal, an output level of the analog signal fluctuates depending on an inside of the module or a state of the signal input to the module. In a case where the amplified analog signal exceeds an upper limit value of the output level, a failure may occur in the module which adjusts the level of the analog signal.

RELATED ART DOCUMENT

Patent Document

[Patent Document 1] JP-A-2019-129333

DISCLOSURE OF THE INVENTION

Problem that the Invention is to Solve

An object of the present disclosure is to prevent an output level of an analog signal from exceeding a predetermined upper limit value, in a module that adjusts a level of the analog signal.

Means for Solving the Problem

According to the present disclosure, there is provided a signal generation apparatus including: a base band module (11) that generates digital base band signals corresponding to a plurality of cells; a DA converter that converts the digital base band signals into modulation signals corresponding to the plurality of cells; an RF converter (20) to which the modulation signals corresponding to the plurality of cells are input, and which outputs an RF signal obtained by frequency-converting the modulation signal; and an RF converter control unit (31), in which the RF converter control unit reduces, in a case where an input level of the modulation signal input to the RF converter exceeds an input limit value of the RF converter, a power value of a digital base band signal corresponding to a predetermined cell among the digital base band signals corresponding to the plurality of cells in the base band module so that the input level of the modulation signal input to the RF converter is equal to or lower than the input limit value of the RF converter.

According to the present disclosure, there is provided a signal generation method using a signal generation apparatus including a base band module (11) that generates digital base band signals corresponding to a plurality of cells; a DA converter that converts the digital base band signals into modulation signals corresponding to the plurality of cells; an RF converter (20) to which the modulation signals corresponding to the plurality of cells are input, and which outputs an RF signal obtained by frequency-converting the modulation signal; and an RF converter control unit (31), the method including: by the RF converter control unit, reducing, in a case where an input level of the modulation signal input to the RF converter exceeds an input limit value of the RF converter, a power value of a digital base band signal corresponding to a predetermined cell among the digital base band signals corresponding to the plurality of cells in the base band module so that the input level of the modulation signal input to the RF converter is equal to or lower than the input limit value of the RF converter; and switching a switch (24, and 25) provided in the RF converter to a path bypassing a power amplifier (21).

Advantage of the Invention

According to the present disclosure, in a module that adjusts a level of an analog signal, it is possible to prevent an output level of the analog signal from exceeding a predetermined upper limit value by reducing a power value of a digital base band signal output from a base band module.

BEST MODE FOR CARRYING OUT THE INVENTION

Figure 1:
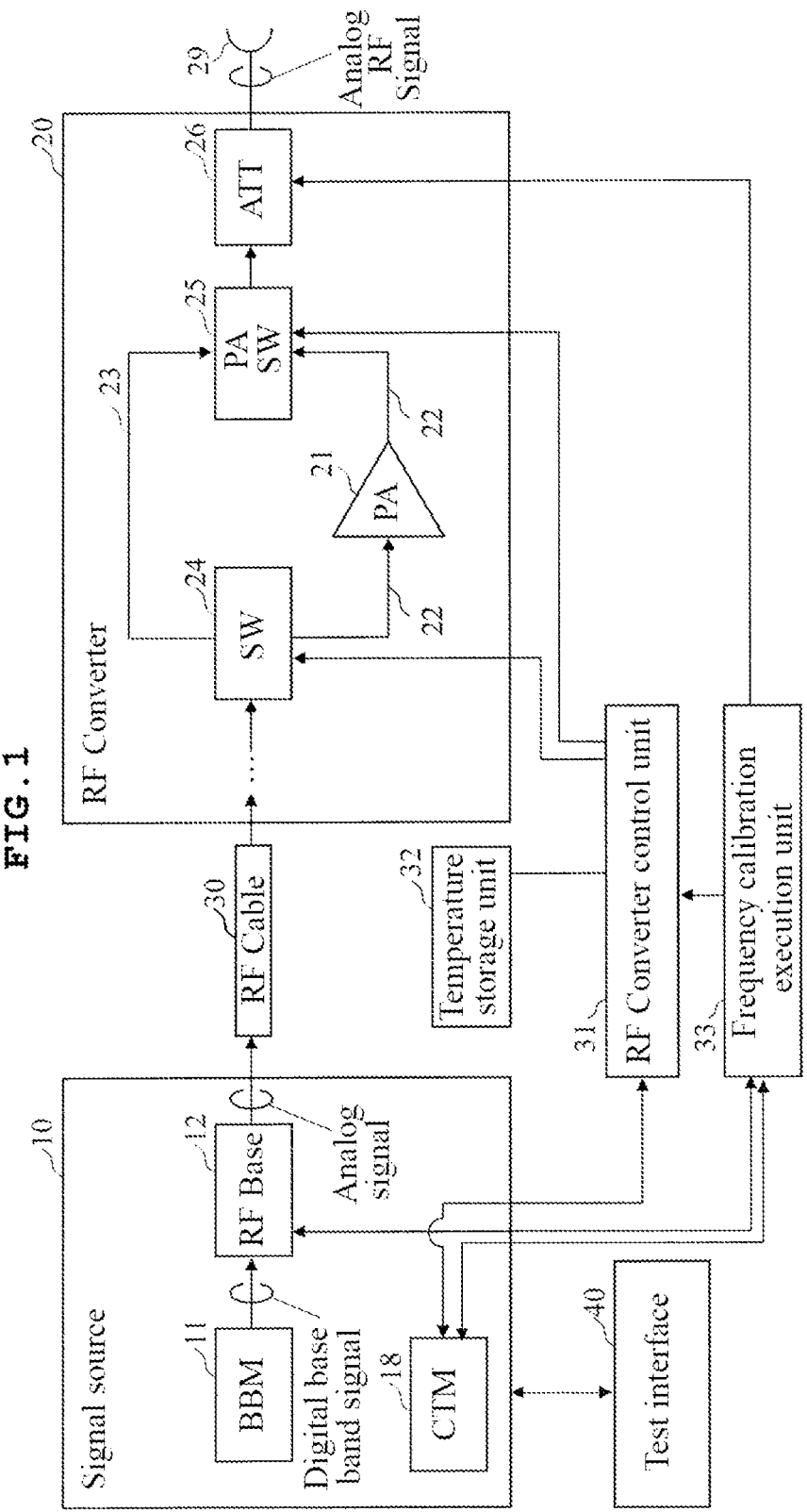
FIG. 1 illustrates an example of a system configuration according to a first embodiment.

Hereinafter, embodiments according to the present disclosure will be described in detail with reference to drawings. The present disclosure is not limited to the embodiments described below. These embodiments are merely examples, and the present disclosure can be implemented in various modifications and improvements based on the knowledge of those skilled in the art. In this specification and the drawings, configuration elements having the same reference numerals indicate the same elements.

First Embodiment

FIG. 1 illustrates an example of a system configuration according to the present embodiment. A system according to the present embodiment includes a configuration for generating an analog RF signal for testing. Specifically, the system according to the present embodiment includes a signal source 10 which generates an analog signal having an intermediate frequency bandwidth, a radio frequency (RF) converter 20 which modulates the analog signal having the intermediate frequency bandwidth to generate an analog RF signal, and a test interface 40 which sets the analog RF signal to be generated by the RF converter 20.

The signal source 10 and the RF converter 20 are connected by an interchangeable RF cable 30. The test interface 40 is connected to the signal source 10 and may also be connected to the RF converter 20. The test interface 40 sets an analog RF signal, and the signal source 10 and the RF converter 20 generate the analog RF signal according to the setting. The generated analog RF signal can be wirelessly transmitted from an antenna 29 provided on the RF converter 20.

The system according to the present embodiment includes a configuration for adjusting an output level of the analog RF signal at an output end of the RF converter 20. Specifically, the system according to the present embodiment includes an RF converter control unit 31, a temperature storage unit 32, and a frequency calibration execution unit 33. The RF converter control unit 31 and the frequency calibration execution unit 33 are connected to the signal source 10 and the RF converter 20.

The signal generation apparatus according to the present disclosure includes the signal source 10. In addition to the signal source 10, the signal generation apparatus according to the present disclosure may include the RF converter 20, the frequency calibration execution unit 33, the RF converter control unit 31, and the temperature storage unit 32. The apparatus according to the present disclosure can also be realized by a computer and a program, and the program can be recorded on a recording medium or provided through a network.

The signal source 10 includes a base band module (BBM) 11 which outputs a digital base band signal, a radio frequency (RF) base 12 which outputs an analog signal having an intermediate frequency bandwidth, and a control module (CTM) 18 which functions as a control unit which controls the BBM 11 and the RF base 12. The BBM 11 generates test signals of any patterns corresponding to a plurality of cells. The RF base 12 includes a digital to analog converter (DA converter) which converts a digital signal into an analog signal, and converts a digital signal from the BBM 11 into an analog signal having an intermediate frequency bandwidth corresponding to each cell.

As a result, modulation signals corresponding to the plurality of cells are generated.

The RF converter 20 according to the present embodiment includes a path 22 which passes through a PA 21 and a path 23 which bypasses the PA 21. The path 22 and the path 23 can be switched by using a switch (hereinafter, referred to as an SW) 24 connected to an input side of the PA 21 and a switch (hereinafter, referred to as a PASW) 25 connected to an output side of the PA 21. The RF converter control unit 31 switches between the path 22 and the path 23.

The RF converter 20, to which the modulation signals corresponding to the plurality of cells are input, outputs an RF signal obtained by frequency-converting the modulation signal. The RF converter 20 includes a power amplifier (hereinafter, referred to as a power amplifier (PA)) which amplifies an analog signal, and an attenuator (ATT) 26 which adjusts an amplitude of the analog signal.

The frequency calibration execution unit 33 adjusts an amplitude of the analog signal having the intermediate frequency bandwidth so that an amplitude of a center frequency of each subcarrier becomes a desired value. For example, the frequency calibration execution unit 33 controls the DA converter provided in the RF base 12 so that a peak value of the amplitude of the analog signal having the intermediate frequency bandwidth output from the RF base 12 becomes a desired value. Further, the frequency calibration execution unit 33 controls the ATT so that a peak value of an amplitude of an analog signal output from the PASW 25 becomes a desired value.

When a level at the output end of the RF converter (hereinafter, referred to as an SG output level) is X [dBm] (a root mean square (RMS) value), and an insertion loss from an output end of the PA 21 to the output end of the RF converter 20 (hereinafter, referred to as an insertion loss after the PA) is W [dB], an input level Y [dBm] (a peak value) of the PASW 25 (=an output level at the output end of PA21) is expressed by the following equation.

(Equation 1)

$$Y = X + W + \Gamma + \Delta + \varepsilon \tag{1}$$

Meanwhile, $\Gamma$ [dB] is a crest factor, $\Delta$ [dB] is a fluctuation amount of an SG output level X in the RF converter 20, and $\varepsilon$ [dB] is a fluctuation amount of a digital gain (RMS) of a digital base band signal input to the RF base 12.

On the other hand, a maximum input level M [dBm] (a peak value) to the PASW 25 is defined by the following equation.

(Equation 2)

$$M = Y_{max} \tag{2}$$

(Equation 3)

$$M = X_{max} + W + \Gamma + \Delta + \varepsilon \tag{3}$$

are satisfied. Here, $X_{max}$ is a maximum value of the SG output signal which can be set, and $X_{max} = +5^2$, for example.

In a case where the inventor measures the insertion loss after PA21, it is approximately 10 dB, that is, W=+10. Therefore, in a case of M=+27 and W=+10, (Equation 4)

$$27 \leq 5 + 10 + \Gamma + \Delta + \varepsilon \tag{4}$$

that is, when (Equation 5)

$$\Gamma + \Delta + \varepsilon \geq 12 \tag{5}$$

is satisfied, the PASW 25 is in an excessive input state in which an excessive load is applied. Therefore, the present disclosure prevents the excessive input state by adjusting a parameter of "$\varepsilon$" included in Equation (5) so that the value is equal to or less than an input limit value of the RF converter 20.

The crest factor $\Gamma$ [dB] is, for example, $\Gamma = 3$. Further, $\Delta$ [dB], which is a fluctuation amount of the SG output level X, is expressed by the following equation.

(Equation 6)

$$\Delta = T \cdot \Delta_T + \Delta_C \tag{6}$$

Here, T [° C.] is a temperature fluctuation after frequency calibration. $\Delta_T$ is a parameter representing a fluctuation of the output level due to the temperature fluctuation, and is, for example, −0.17 [dB/° C.]. $\Delta_C$ is a parameter representing a fluctuation of the output level due to the cable, for example, $|\Delta_C| > 0.5$.

If a temperature detected by the temperature sensor 27 when the frequency calibration is executed is $T_{ref}$ [° C.] and a current temperature detected by the temperature sensor 27 after the frequency calibration is executed is $T_{cur}$ [° C.], it is expressed as $T=T_{cur}-T_{ref}$. In a case where the temperature drops by 5° C., that is, when T=−5, $T \cdot \Delta_T$=+0.85. In a case where the temperature rises by 10° C., that is, when T=+10, $T \cdot \Delta_T$=−1.7.

Regarding ε [dB], when the digital gain (RMS) of the digital base band signal input to the RF base 12 is g [dB full scale (Fs)] and a reference level of the DA converter provided in the RF base 12 is r [dB Fs], (Equation 7)

$$\varepsilon = g - r \qquad (7)$$

is expressed.

When r=−10, for Equation (7), (Equation 8)

$$\varepsilon = g + 10 \qquad (8)$$

is satisfied. Under a condition of g=r, Equation (8) becomes ε=0. Therefore, in the present embodiment, ε≤0.

Under a condition that ε=0 in a case where an output level of a digital base band signal (total power of a modulation wave) is set to +10 dBm, when the output level of the digital base band signal from the BBM 11 is increased by 1 dB to +11 dBm, ε is changed to ε=1, and when the output level of the digital base band signal is decreased by 1 dB to +9 dBm, ε is changed to ε=−1.

Here, in a case where the BBM 11 outputs the digital base band signals of eight cells of cell numbers #1 to #8, the output level (total power of the modulation wave) P [dBm] of the digital base band signal is defined as the following equation.

(Equation 9)

$$P = 10 \cdot \log_{10} \left[ \sum_{n=1}^{8} \left\{ N_{SC}^{RB} \cdot N_{RB}^{CELL}(n) \cdot 10^{\frac{P_{EPRE}(n)}{10}} \right\} \right] \qquad (9)$$

Meanwhile, $N^{RB}_{SC}$ is the number of subcarriers per one resource block (hereinafter, may be referred to as a resource block (RB), $N^{CELL}_{RB}(n)$ is the number of resource blocks to be transmitted from each of the plurality of cells, and $P_{EPRE}(n)$ is power per energy per resource element (EPRE) of each of the plurality of cells, that is, power per subcarrier. A unit of $P_{EPRE}(n)$ is expressed in [dBm/15.2$^\mu$ kHz] by using $\mu \in \{m: 0 \leq m \leq 5\}$. In addition, $N^{RB}_{SC}$ is, for example, 12.

In a case of ε≤0, it may be limited to P≤+10. Therefore, in the present embodiment, in a case where (Equation 10)

$$P \geq +10 \qquad (10)$$

is satisfied, the output level of the digital base band signal is limited. As a result, the output level of the analog signal input to the RF converter 20 is limited, so that an excessive input state of the RF converter 20 can be prevented.

Here, a value of r in Equation (7) may be selectable. Therefore, in the present embodiment, the following equation, which is a generalization of Equation (10), is used.

(Equation 11)

$$P > P_{th} \qquad (11)$$

$P_{th}$ is a threshold value corresponding to the value of r in Equation (7). For example, in a case where the analog RF signal is a 5G NR signal, $P_{th}$=16, and in a case where the analog RF signal is another analog RF signal, $P_{th}$=10 is used. That is, $P_{th}$ is determined by a type of analog RF signal.

The CTM 18 obtains an output level P of the digital base band signal by using Equation (9), and limits the output level of the digital base band signal in a case where Equation (11) is satisfied. For example, the CTM 18 instructs the BBM 11 on the output level of the digital base band signal, and the BBM 11 outputs the digital base band signal of the output level instructed by the CTM 18. A timing for executing a calculation and limitation on the output level of the digital base band signal is any timing, and the CTM 18 uses reception of various instructions such as primitives, for example, as a trigger.

Figures 2, 3:
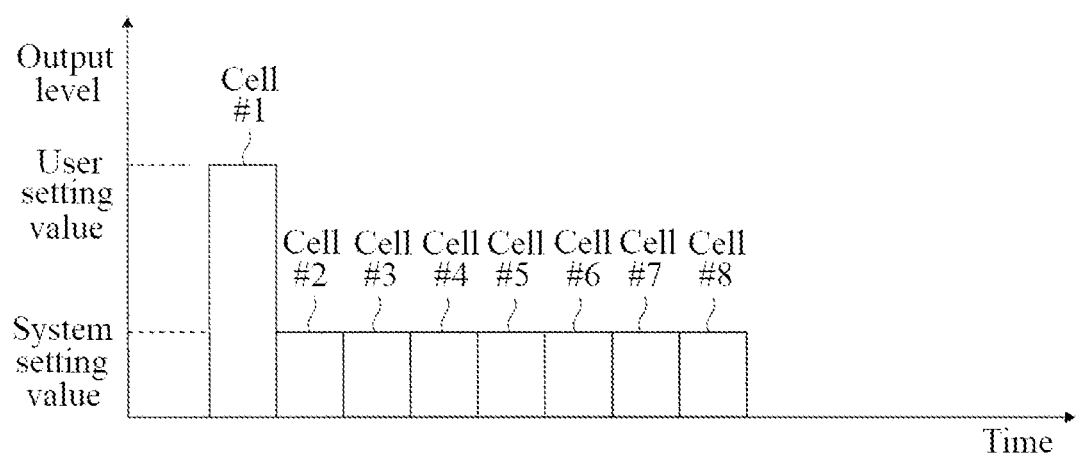
FIG. 2 illustrates an example of a parameter setting table.
FIG. 3 illustrates a first specific example of limiting an output level of a digital base band signal.

The modulation signal has a plurality of subcarriers and a plurality of resource blocks corresponding to respective cells. Therefore, the CTM 18 holds a parameter setting table that defines a parameter of a modulation signal corresponding to each cell. FIG. 2 illustrates an example of a parameter setting table. The parameter setting table includes subcarrier spacing (SCS), a channel bandwidth (CBW), a maximum resource block (RB) (MAX RB), an EPRE, a cell setting flag, and a physical channel setting flag. FIG. 2 illustrates a case where eight cells of the cell numbers #1 to #8 are set, and the number of cells can be any number set by the test interface 40.

The SCS is an interval of subcarrier frequencies, for example, 15 kHz, 30 kHz, 60 kHz, 120 kHz, 240 kHz, and 480 kHz.

The CBW is a bandwidth of each channel, for example, 5 MHz, 10 MHz, 15 MHz, 20 MHz, 25 MHz, 40 MHz, 50 MHz, 60 MHz, 80 MHz, 100 MHz, 200 MHz, and 400 MHz.

The MAX RB is the maximum value of the number of resource blocks, for example, 270.

The EPRE is set by a user. For example, in a case where power of a cell is set to EPRE=−25.1 dBm/30 kHz under a condition of SCS=30 kHz and the number of resource blocks=270, the output level (total power) of the digital base band signal of the cell is calculated as the following equation.

(Equation 12)

$$10 \cdot \log \left( 10^{\frac{-25.1}{10}} \cdot 270 \cdot 12 \right) = -10.0 [dBm] \qquad (12)$$

The output level of each cell is calculated from values of these SCS, CBW, MAX RB, and EPRE.

The cell setting flag is a flag for setting whether or not to limit the output level of the digital base band signal of each cell. In a case where the cell setting flag is "invalid", the CTM 18 does not limit the output level of the digital base band signal of the cell. In a case where the cell setting flag is "valid", the CTM 18 limits the output level of the digital base band signal output from the BBM 11 to be equal to or less than the threshold value $P_{th}$.

The physical channel setting flag is a flag for setting whether or not to limit the output level of the digital base band signal for each channel unit of a physical channel. In a case where the physical channel setting flag is "invalid", the CTM 18 does not limit the output level of the digital base band signal of the subcarrier. In a case where the physical channel setting flag is "valid", the CTM 18 limits the output level of the digital base band signal output from the BBM 11 to be equal to or less than the threshold value $P_{th}$.

When the CTM 18 receives a primitive after activation, the CTM 18 executes a process corresponding to each primitive.

Primitive "FG_CPHY_CELL_CONFIG_REQ"

When the SCS, the CBW, and the MAX RB of each cell are input to the test interface 40, the test interface 40 outputs the present primitive to the CTM 18. The CTM 18 updates the SCS, the CBW, and the MAX RB of a cell designated by the test interface (unit) 40, among parameters defined in the parameter setting table.

When the cell setting flag is set to "valid" in the test interface 40, the test interface 40 outputs the present primitive to the CTM 18. The CTM 18 sets the cell setting flag of the cell designated by the test interface 40 to "valid".

The CTM 18 applies the updated values of the parameter setting table to Equation (9) so as to calculate the output level P of the digital base band signals of the cells #1 to #8. In a case where the output level P exceeds the threshold value $P_{th}$ and Equation (11) is satisfied, the CTM 18 reduces the output level of the digital base band signal of the cell in which the cell setting flag is set to "valid". As a result, the present embodiment limits the output level of the digital base band signal output from the BBM 11 to be equal to or less than the threshold value $P_{th}$.

Primitive "FG_CPHY_CELL_RELEASE_REQ"

When the cell setting flag is set to "invalid" in the test interface 40, the test interface 40 outputs the present primitive to the CTM 18. The CTM 18 sets the cell setting flag of the cell designated by the test interface to "invalid", among the parameters defined in the parameter setting table.

Primitive "FG_CMAC_SCH_CONFIG_REQ"

When the EPRE of each cell is input to the test interface 40, the test interface 40 outputs the present primitive to the CTM 18. The CTM 18 updates the EPRE of the cell designated by the test interface 40, among the parameters defined in the parameter setting table.

When the physical channel setting flag is set to "valid" in the test interface 40, the test interface 40 outputs the present primitive to the CTM 18. The CTM 18 sets the physical channel setting flag of the cell designated by the test interface 40 to "valid".

The CTM 18 applies the updated values of the parameter setting table to Equation (9) so as to calculate the output level P of the digital base band signals of the cells #1 to #8. In a case where the output level P exceeds the threshold value $P_{th}$ and Equation (11) is satisfied, the CTM 18 reduces the output level of the digital base band signal of the cell, in which the physical channel setting flag is set to "valid", in channel units of the physical channel. As a result, the present embodiment limits the output level of the digital base band signal output from the BBM 11 to be equal to or less than the threshold value $P_{th}$.

Primitive "FG_CMAC_SCH_RELEASE_REQ"

When the physical channel setting flag is set to "invalid" in the test interface 40, the test interface 40 outputs the present primitive to the CTM 18. The CTM 18 sets the physical channel setting flag of the cell designated by the test interface 40 to "invalid", among the parameters defined in the parameter setting table.

Primitive "FG_CPHY_TRX_ROUTING_REQ"

The CTM 18 calculates the output level P of the digital base band signal in a case where each value of the SCS, the CBW, the MAX RB, and the EPRE is updated. In a case where the output level P exceeds the threshold value $P_{th}$ and Equation (11) is satisfied, the CTM 18 reduces the output level of the digital base band signal of the cell in which the cell setting flag is set to "valid". As a result, the present embodiment limits the output level of the digital base band signal output from the BBM 11 to be equal to or less than the threshold value $P_{th}$.

Primitive "FG_CPHY_CELL_POWER_REQ"

The CTM 18 updates the EPRE of the cell according to a target channel designated by the test interface 40.

Here, in a case where the cell setting flag of the cell designated by the test interface 40 is set to "valid", the CTM 18 updates the EPRE of the cell designated by the test interface 40, among the parameters defined in the parameter setting table.

The CTM 18 applies the updated values of the parameter setting table to Equation (9) so as to calculate the output level P of the digital base band signals of the cells #1 to #8. In a case where the output level P exceeds the threshold value $P_{th}$ and Equation (11) is satisfied, the CTM 18 reduces the output level of the digital base band signal of the cell in which the cell setting flag is set to "valid". As a result, the present embodiment limits the output level of the digital base band signal output from the BBM 11 to be equal to or less than the threshold value $P_{th}$.

FIG. 3 illustrates a first specific example of limiting an output level of a digital base band signal.

In a case where (i) in a parameter setting table, a cell setting flag of the cell #1 is "invalid", (ii) In the parameter setting table, cell setting flags of the cells #2 to #8 are "valid", and (iii) the output level P of the cells #1 to #8 calculated by using Equation (9) exceeds the threshold value $P_{th}$, the BBM 11 outputs the output level of the cell #1 at an output level defined by the EPRE in the parameter setting table, and outputs the output levels of the cells #2 to #8 at a predetermined system setting value.

Here, the system setting value is, for example, the lowest value among values of the settable EPRE. As described above, in the present embodiment, the output level defined by the EPRE in the parameter setting table is blocked for all the cells #2 to #8 in which the cell setting flag is set to "valid", and the system setting value is reduced. As a result, the present embodiment limits the output level of the digital base band signal from the BBM 11 to be equal to or less than the threshold value $P_{th}$.

Figure 4:
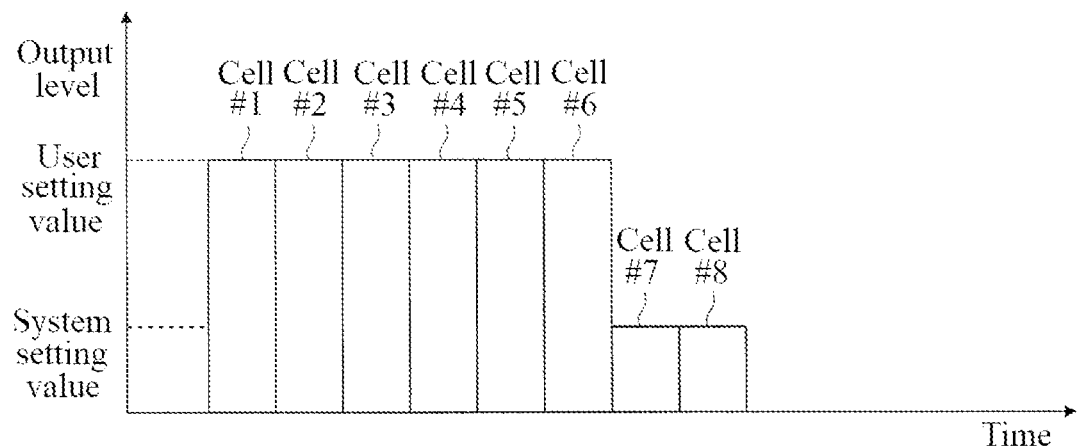
FIG. 4 illustrates a second specific example of limiting the output level of the digital base band signal.

FIG. 4 illustrates a second specific example of limiting the output level of the digital base band signal.

FIG. 3 illustrates an example in which the output levels of all the cells #2 to #8 in which the cell setting flag is set to "valid" are reduced to the system setting values, and the present disclosure is not limited to this.

For example, in a case where the output level P of the cells #1 to #8 becomes equal to or less than the threshold value $P_{th}$ calculated by using Equation (9), by reducing only some cells #7 and #8 among the cells #2 to #8 in which the cell setting flag is set to "valid" to the system setting values, the CTM 18 may reduce only some cells #7 and #8 among the cells #2 to #8 in which the cell setting flag is set to "valid" to the system setting value, as illustrated in FIG. 4.

Figure 5:
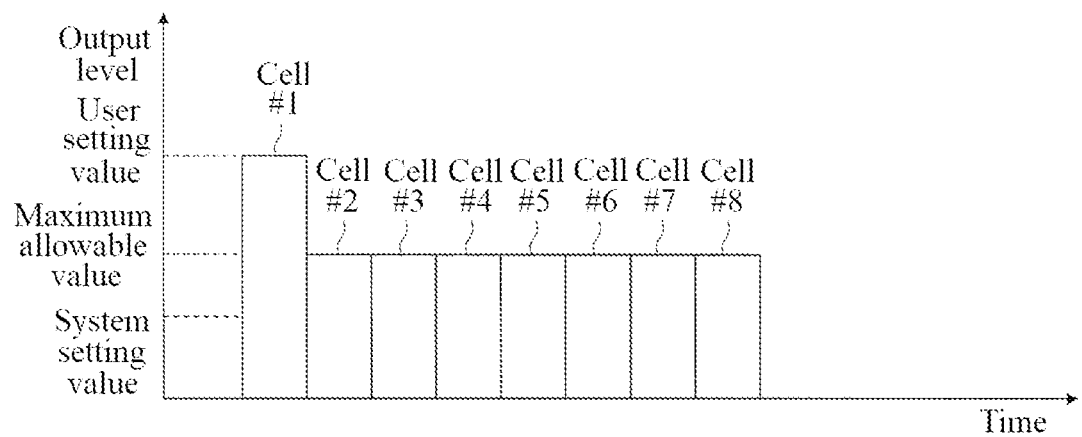
FIG. 5 illustrates a third specific example of limiting the output level of the digital base band signal.

FIG. 5 illustrates a third specific example of limiting the output level of the digital base band signal.

FIG. 3 illustrates an example of reducing the output level of the cells #2 to #8 in which the cell setting flag is set to "valid" to the system setting value, and the output level to be reduced is not limited to the system setting value.

For example, the CTM 18 may obtain the maximum allowable output level of the cells #2 to #8 at which the output level P of the cells #1 to #8 calculated by using Equation (9) can be equal to or less than the threshold value $P_{th}$, and reduce the output level of the cells #2 to #8 to the maximum allowable value.

As described above, in a case where the output level P of the cells #1 to #8 calculated by using Equation (9) exceeds the threshold value $P_{th}$, the CTM 18 limits the output level of the digital base band signal in at least one cell in which the cell setting flag is set to "valid". The test interface 40 can select whether to reduce the output level to the system setting value or to reduce the output level to the maximum allowable output level. Further, the test interface 40 can select whether to limit the output level of all the cells in which the cell setting flag is set to "valid" or to limit the output level of the minimum necessary cell.

In the present embodiment, the cell in which the cell setting flag is set to "valid" is described, and the present disclosure has the same manner as a case of the cell in which the physical channel setting flag is set to "valid". For example, in a case where the output level P of the cells #1 to #8 calculated by using Equation (9) exceeds the threshold value $P_{th}$, the output level of the digital base band signal of at least one cell in which the physical channel setting flag is set to "valid" is limited in channel units of the physical channel.

A fourth specific example of limiting the output level of the digital base band signal will be described. Here, the number of cells is two, which are the cell #1 and the cell #2. When the cell #2 is added to the cell #1, the CTM 18 adjusts a setting of the output level $P_{SetCell}$ of the cell #2 to be added so that the output level P does not exceed the threshold value $P_{th}$ due to the addition of the cell.

(Equation 13)

$$P_{SetCell} = P_{th} - P_{OtherCell} \quad (13)$$

Here, "$P_{SetCell}$" is an output level of the cell to be added, and "$P_{OtherCell}$" is an output level of the other cell. In a case where the cell #1 is add to the cell #2, $P_{SetCell}$ is $P_{Cell2}$, and $P_{OtherCell}$ is $P_{Cell1}$.

For example, setting values of the output levels of the cell #1 and the cell #2 set by the test interface 40 are set to $P_{Cell1\_Pri}=+8$ dBm, $P_{Cell2\_Pri}=+8$ dBm, and $P_{th}=10$ dBm. Regarding a setting value of the cell #1, $P_{Cell1}=+8$ dBm, and regarding a setting value of the cell #2, $P_{Cell2}=P_{th}-P_{Cell1}$, so that $P_{Cell2}\approx5.7$ dBm is obtained. This limiting method is appropriate to a case where a value of $P_{th}$ is compared with a setting value of the level of each cell, and the value of the level of each cell is close to the value of $P_{th}$, that is, $P_{Cell1}$, $P_{Cell2}<P_{th}$ and $P_{Cell1}+P_{Cell2}>P_{th}$. Further, the limiting method is appropriate to a case where setting values of levels of two cells are the same when the number of cells is increased, or a case where the cells are set in an order of the cell #1 to the cell #2.

A fifth specific example of limiting the output level of the digital base band signal will be described. Here, the number of cells is two, which are the cell #1 and the cell #2. The CTM 18 adjusts the cell #1 and the cell #2 in a balanced manner.

(Equation 14)

$$P_{EPRE} = P_{th}/N_{RETotal} \quad (14)$$

Here, $N_{RETotal}$ is the number of cells, and in the present embodiment, $N_{RETotal}=2$.

For example, the setting values of the levels of the cell #1 and the cell #2 set by the test interface 40 are $P_{Cell1\_Pri}=+15$ dBm, $P_{Cell2\_Pri}=+15$ dBm, and $P_{th}=10$ dBm. The CTM 18 is set to $P_{Cell1}\approx+10$ dBm in a case where the output level of only the cell #1 is set. Next, in a case where the output level of the cell #2 is set, from $P_{SetCell}=P_{th}/N_{RETotal}$, $P_{Cell1}=+7$ dBm and $P_{Cell2}=+7$ dBm are obtained. This limiting method is appropriate to a case where the value of $P_{th}$ is compared with the setting value of the level of each cell, and the setting value of the level of each cell is too large for the value of $P_{th}$, that is, a case of $P_{Cell1}$, $P_{Cell2}>P_{th}$.

Second Embodiment

Figure 6:
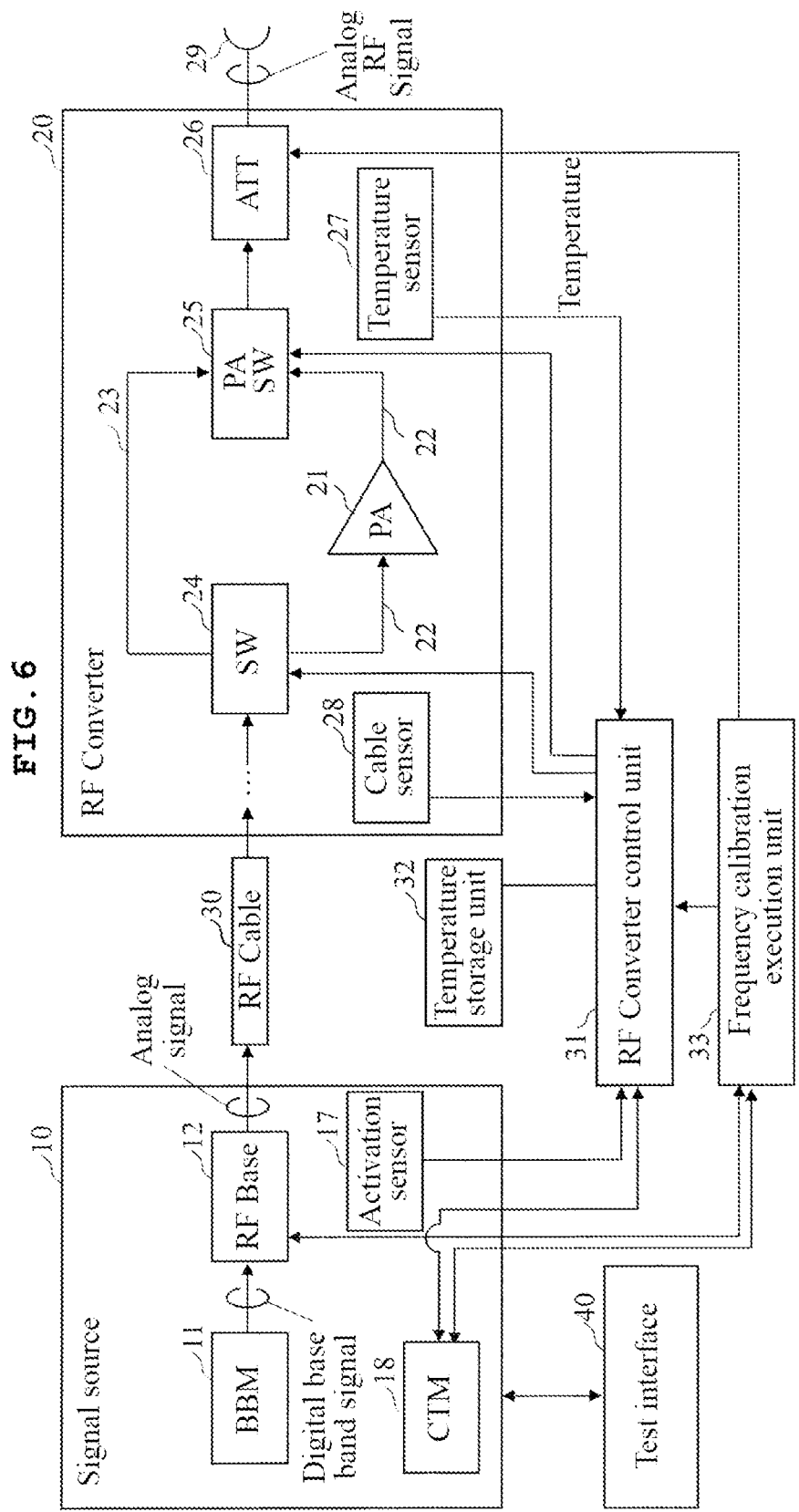
FIG. 6 illustrates an example of a system configuration according to a second embodiment.

FIG. 6 illustrates an example of a system configuration according to the present embodiment. The signal source 10 according to the present embodiment includes the activation sensor 17 which detects ON and OFF of a power supply of the signal source 10. The RF converter 20 according to the present embodiment includes a temperature sensor 27 which measures a temperature inside the RF converter 20, and a cable sensor 28 which detects connection or disconnection of the RF cable 30.

In a case where an output level of the analog signal amplified by the PA 21 exceeds an absolute maximum rating predetermined for the RF converter 20, it becomes an excessive input state in which an excessive load is applied to the PASW 25. Therefore, the present disclosure prevents the excessive input state by switching between the path 22 and the path 23.

Figure 7:
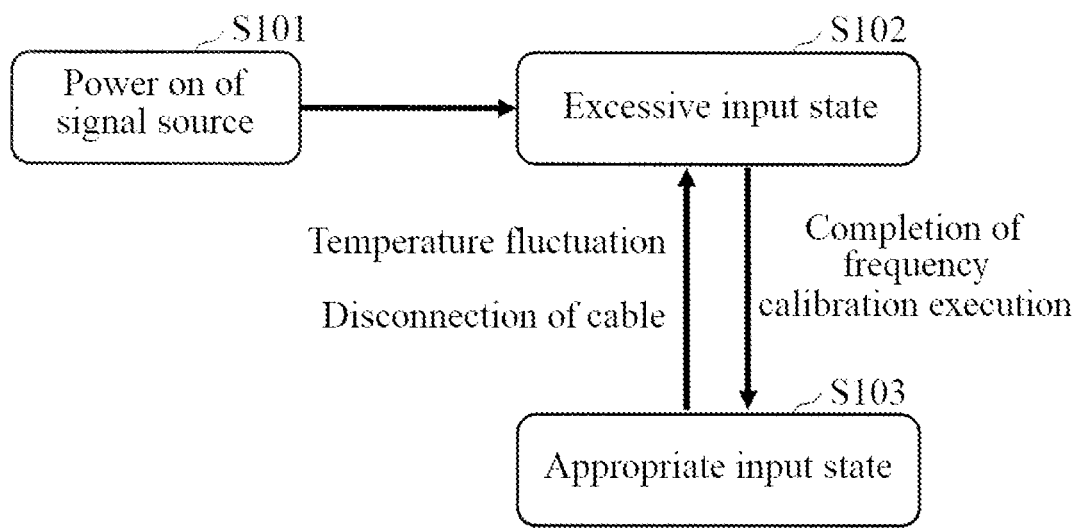
FIG. 7 illustrates an example of a state transition diagram of an RF converter according to the embodiment.

FIG. 7 illustrates an example of a state transition diagram of an SG signal output according to the embodiment. The present embodiment has two states of an excessive input state S102 and an appropriate input state S103. The excessive input state S102 is a state in which an excessive load may be applied to the PASW 25. The appropriate input state S103 is a state in which an appropriate current flows into the PASW 25.

When the signal source 10 is activated (S101), the activation sensor 17 notifies the RF converter control unit 31 that the signal source 10 is activated. The RF converter control unit 31 uses this notification as a trigger to connect the SW 24 and the PASW 25 to the path 23. In this manner, in the present disclosure, immediately after the signal source 10 is activated, the state transitions to the excessive input state S102, and in the excessive input state S102, the path 22 is not connected.

When the user performs an operation of frequency calibration with the test interface 40, the frequency calibration execution unit 33 executes the frequency calibration. When the frequency calibration execution unit 33 completes the execution of the frequency calibration, the frequency calibration execution unit 33 notifies the RF converter control unit 31 that the execution of the frequency calibration is completed, and the RF converter 20 transitions to the appropriate input state S103. The RF converter control unit 31 can connect the SW 24 and the PASW 25 to the path 22, by the SG output level. Further, the RF converter control unit 31 records a temperature detected by the temperature sensor 27 as $T_{ref}$ [° C.] in the temperature storage unit 32.

After the transition to the appropriate input state S103, the RF converter control unit 31 determines whether or not to transition to the excessive input state S102. A determination interval is, for example, every 10 seconds. In a case of transitioning to the excessive input state S102, the RF converter control unit 31 switches SW 24 and PASW 25 to the path 23.

In the present disclosure, the modulation signals corresponding to the plurality of cells are input to the RF converter 20. In a case where the input level of the modulation signal corresponding to the plurality of cells exceeds the input limit value of the RF converter, the RF converter control unit 31 determines that transition to the excessive input state S102 occurs. For example, the RF converter control unit 31 acquires the output level P [dBm] calculated by the CTM 18, and determines that the excessive input state occurs when $P > P_{th}$.

The RF converter control unit 31 may further determine the transition to the excessive input state S102 by using the following determination method. In that case, in a case where it is determined that the excessive input state occurs by using any one of the methods, the RF converter control unit 31 switches the SW 24 and the PASW 25 to the path 23.

For example, the RF converter control unit 31 determines whether or not the RF converter 20 transitions to the excessive input state S102, based on a temperature fluctuation detected by the temperature sensor 27. For example, the RF converter control unit 31 acquires a current temperature $T_{cur}$ [° C.] from the temperature sensor 27 and obtains the temperature fluctuation $T = T_{cur} - T_{ref}$. The RF converter control unit 31 uses the temperature fluctuation T to obtain a fluctuation $\Delta$ of an output level of an analog RF signal at the output end of the RF converter 20. In a case where the fluctuation $\Delta$ becomes equal to or more than a predetermined value, the RF converter control unit 31 determines that the transition to the excessive input state S102 occurs. Here, the predetermined threshold value is, for example, 9 based on Equation (13) to be described below.

The transition to the excessive input state S102 may occur not only due to a temperature inside the RF converter 20, but also due to disconnection between the signal source 10 and the RF converter 20. Therefore, the RF converter control unit 31 detects connection and disconnection of the RF cable 30 by using the cable sensor 28. The detection of connection and disconnection of the cable can be performed, for example, based on the presence or absence of a signal from a port to which the cable is connected.

The cable sensor 28 may further detect connection and disconnection of a control cable (not illustrated) between the signal source 10 and the RF converter 20 and connection and disconnection of a power source cable (not illustrated) of the RF converter 20. In this case, the RF converter control unit 31 performs the same operation as the connection and disconnection of the RF cable 30.

In a case where the transition from the appropriate input state S103 to the excessive input state S102 occurs, the RF converter control unit 31 may notify a user of an alert indicating that the state is the excessive input state. For example, the RF converter control unit 31 displays that the state is the excessive input state and a cause of the state, on the test interface 40. For example, the fact that the state transitions to the excessive input state due to the temperature fluctuation, or that the state transitions to the excessive input state due to the disconnection of the cable is displayed on the test interface 40.

In a case where the SG output signal is output at the reference level ($\varepsilon = 0$), $\Gamma = 3$ is obtained. For that reason, when (Equation 15)

$$\Delta \geq 9 \quad (15)$$

is satisfied, the RF converter 20 is in the excessive input state S102.

Specifically, after executing frequency calibration under a normal temperature environment (23° C.), when the SG output level X is set to +10 dBm so as to execute the frequency calibration under a low temperature environment (5° C.), the PASW 25 fails. Here, the fluctuation $\Delta$ of the SG output level X due to the temperature change is approximately 3 dB based on Equation (2). Further, in a case where a path of the RF converter 20 is set to the path 22, the output level increases by approximately 1 dB due to the influence of reflection. Therefore, under the low temperature environment (when the frequency calibration is not executed), the input level Y [dBm] (a peak value) of the PASW 25 is determined as the following equation, by using Equation (1).

(Equation 16)

$$Y = X + W + \Gamma + \Delta + \varepsilon = +10 + 10 + 3 + (3 + 1 + \alpha) + 0 = +27 + \alpha \quad (16)$$

Meanwhile, $\alpha$ [dB] is an error due to an individual difference. As a result, it is considered that a signal exceeding the maximum input level is input to the PASW 25.

In a case where Equation (15) is satisfied in a state in which frequency calibration is not executed, that is, at least one of a case where frequency calibration is not executed at low temperature after executing the frequency calibration at high temperature, and a case where the signal source 10 and the RF converter 20 are connected by the RF cable 30 having a large loss and frequency calibration is executed, and then the RF cable 30 having the large loss is replaced with the RF cable 30 having a small loss and the frequency calibration is not executed, the excessive input state S102 may occur.

The setting upper limit value $X_{max}$ of the SG output level X in the appropriate input state S103 is, for example, $X_{max} = +5$ [dBm]. The setting upper limit value $X_{max}$ of the SG output level X in the excessive input state S102 is, for example, $X_{max} = -13$ [dBm]. As a result, the excessive input condition to the RF converter 20 can be relaxed to $\Delta \geq 27$.

In a case where the SG output level X exceeding $X_{max}$ is set in the test interface 40, the RF converter control unit 31 may round the SG output level X to $X_{ax}$. Further, $X_{max} = -13$ may be set by the test interface 40. In this case, the path 23 is always applied assuming that the state is excessive input state S102, and it is possible to physically guarantee that the PASW 25 does not fail.

The present disclosure can be applied to information communication industry.

DESCRIPTION OF REFERENCE NUMERALS AND SIGNS

10: Signal source
11: BBM
12: RF base
17: Activation sensor
18: CTM
20: RF converter
21: PA
22, 23: Path
24: SW
25: PASW
26: ATT
27: Temperature sensor
28: Cable sensor
30: RF cable
31: RF converter control unit
32: Temperature storage unit
33: Frequency calibration execution unit
40: Test interface

What is claimed is:

1. A signal generation apparatus comprising:
   a base band module that generates digital base band signals corresponding to a plurality of cells;
   a digital-to-analog (DA) converter that converts the digital base band signals into modulation signals corresponding to the plurality of cells;
   an RF converter to which the modulation signals corresponding to the plurality of cells are input, and which outputs a radio frequency (RF) signal obtained by frequency-converting the modulation signal; and
   an RF converter control unit,
   wherein the RF converter control unit reduces, in a case where an input level of the modulation signal input to the RF converter exceeds an input limit value of the RF converter, a power value of a digital base band signal corresponding to a predetermined cell among the digital base band signals corresponding to the plurality of cells in the base band module so that the input level of the modulation signal input to the RF converter is equal to or lower than the input limit value of the RF converter.

2. The signal generation apparatus according to claim 1, wherein the input level of the modulation signal is determined by the number of resource blocks transmitted by each of the plurality of cells, the number of subcarriers per resource block, and power per the subcarrier.

3. The signal generation apparatus according to claim 1,
   wherein the RF converter includes a power amplifier, and a switch that switches between a path passing through the power amplifier and a path bypassing the power amplifier, and
   the switch provided in the RF converter is switched to the path bypassing the power amplifier.

4. The signal generation apparatus according to claim 3, further comprising:
   a temperature sensor,
   wherein the RF converter control unit switches the switch to the path bypassing the power amplifier, based on a fluctuation of a temperature measured by the temperature sensor.

5. The signal generation apparatus according to claim 1,
   wherein the RF converter control unit reduces, in a case where the input level of the modulation signal exceeds a predetermined threshold value, the power value of the digital base band signal corresponding to the predetermined cell among the digital base band signals corresponding to the plurality of cells in the base band module, and
   the threshold value is determined by a type of the RF signal.

6. The signal generation apparatus according to claim 5, wherein the RF converter control unit sets an output value of a newly added cell among the plurality of cells to a difference of the output value of the existing cell from the predetermined threshold value to reduce the power value of the digital base band signal of the predetermined cell.

7. The signal generation apparatus according to claim 5, wherein the RF converter control unit sets an output value of the plurality of cells to a value obtained by dividing the predetermined threshold value by the number of the plurality of cells to reduce the power value of the digital base band signal of the predetermined cell.

8. The signal generation apparatus according to claim 1,
   wherein the RF converter control unit holds a parameter setting table that defines parameters of the plurality of cells, and
   the parameter includes a subcarrier spacing (SCS), a channel bandwidth (CBW), a maximum resource block (MAXRB), an energy per resource element (EPRE), a cell setting flag, and a physical channel setting flag.

9. The signal generation apparatus according to claim 8, wherein the RF converter control unit reduces a power value of a digital base band signal corresponding to all cells in which the cell setting flag is set to "valid", and outputs a system setting value of all the cells.

10. The signal generation apparatus according to claim 8, wherein the RF converter control unit reduces a power value of a digital base band signal corresponding to some cells in which the cell setting flag is set to "valid", and outputs a system setting value of some of the cells.

11. The signal generation apparatus according to claim 8, wherein the RF converter control unit obtains a maximum allowable value, at which the input level of the modulation signal is equal to or lower than the predetermined threshold value, of a power value of a digital base band signal corresponding to all cells in which the cell setting flag is set to "valid", and outputs the maximum allowable value.

12. A signal generation method using a signal generation apparatus including a base band module that generates digital base band signals corresponding to a plurality of cells; a digital-to-analog (DA) converter that converts the digital base band signals into modulation signals corresponding to the plurality of cells; a radio frequency (RF) converter to which the modulation signals corresponding to the plurality of cells are input, and which outputs an RF signal obtained by frequency-converting the modulation signal; and an RF converter control unit, the method comprising:
   by the RF converter control unit,
   reducing, in a case where an input level of the modulation signal input to the RF converter exceeds an input limit value of the RF converter, a power value of a digital base band signal corresponding to a predetermined cell among the digital base band signals corresponding to the plurality of cells in the base band module so that the input level of the modulation signal input to the RF converter is equal to or lower than the input limit value of the RF converter; and
   switching a switch provided in the RF converter to a path bypassing a power amplifier.

* * * * *